(No Model.)

G. W. BUMGARNER.
SHUT-OFF COCK.

No. 346,462. Patented Aug. 3, 1886.

Witnesses:
J. Mason Goszler
F. P. Hagan

George W. Bumgarner
Inventor:
per Goszler & Williams
Attorneys

UNITED STATES PATENT OFFICE.

GEORGE W. BUMGARNER, OF BALTIMORE, MARYLAND.

SHUT-OFF COCK.

SPECIFICATION forming part of Letters Patent No. 346,462, dated August 3, 1886.

Application filed February 10, 1886. Serial No. 191,462. (No model.)

*To all whom it may concern:*

Be it known that I, GEORGE W. BUMGARNER, of Baltimore city, State of Maryland, have invented certain new and useful Improvements in Shut-Off Cocks, of which the following is a specification, reference being had to the accompanying drawings, forming part hereof, in which—

Figure 1:
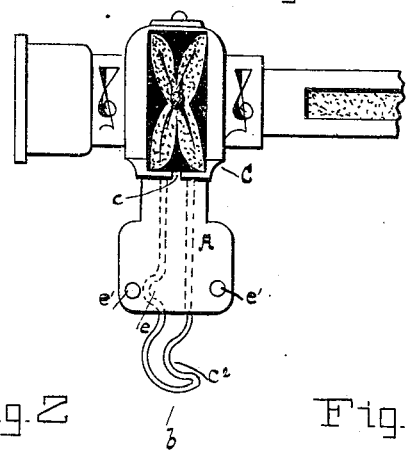
Figure 2:
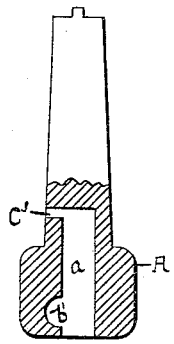
Figure 3:
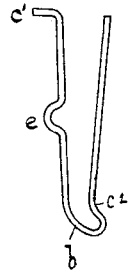

Figure 1 is a vertical elevation. Fig. 2 is a sectional view of Fig. 1 through line $x\,x$, and Fig. 3 is a vertical view of the spring.

Like letters of reference indicate similar parts in all figures.

My invention relates to shut-off cocks in gas-brackets, and has for its object the insuring of the safe shutting off of the gas, thereby preventing the too-frequent accidents of suffocation by gas by accidentally turning it partially on in removing the fingers from the cock after the operator has apparently closed the cock; and as it is applied to the ordinary bracket in every-day use a description of my improved shut-off cock will be only necessary for the purposes of this specification.

Referring to the drawings by letter, A is the shut-off cock, attached in the usual manner to a gas-bracket. This shut-off cock A is made in two pieces, within which is a vertical slot, $a$, corresponding in shape to the vertical wire (or other metal) spring $b$, within which vertical slot is a recess, $b'$, to admit of the reception of the bent portion $e$ of spring $b$. The office of this recess $b'$ is to hold the wire spring $b$ at all times in its normal position. The two halves of the shut-off cock A are held together by rivets $e'\,e'$, or in any other manner as may suit the fancy.

C is an annular flange upon the bracket, and differs from the ordinary flange, in that it extends entirely around the underneath part of the bracket. This annular flange C has a slot, $c$, on opposite sides thereof, for the purpose of allowing the free ingress and egress of the pin end $c'$ of the vertical spring $b$.

$c^3$ is a hole in the cock A, to admit of the passage in and out of the pin end $c'$ of spring $b$.

To operate my shut-off cock it is only necessary to place the thumb against the outer edge of the cock A, simultaneously placing the finger in the curved portion of the lower end of the trigger $c^2$ of the spring $b$, then pulling the trigger with the finger, when the pin end $c'$ will instantly relieve itself from the slot $c$ and the cock A easily be turned lengthwise of the bracket, thereby admitting of the free passage of the gas. When it is desired to shut the gas off securely, it is only necessary to turn the cock A in the ordinary manner when the click noise of the spring will notify the operator that the gas is shut off, without a particle of danger of the gas escaping therefrom, and the cock cannot again be turned in either direction without observing the instructions embraced in the fore part of this description of its operation.

What I claim is—

The combination, with a gas cock or fixture, of a projection, C, provided with the slot $c$, a cut-off valve, A, formed of two pieces secured by rivets $e'\,e'$, and provided with slot $a$ and recess $b'$, and a spring, $b$, provided with the pin end $c'$, and triggers $c^2$, substantially in the manner set forth.

GEORGE W. BUMGARNER.

Witnesses:
J. MASON GOSZLER,
JNO. T. MADDOX.